(12) United States Patent
Ichihara et al.

(10) Patent No.: US 6,339,582 B1
(45) Date of Patent: Jan. 15, 2002

(54) OPTICAL DISK AND RECORDING/REPRODUCING METHOD THEREOF

(75) Inventors: Katsutaro Ichihara, Yokohama; Toshihiko Nagase, Tokyo, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/272,777

(22) Filed: Mar. 19, 1999

(30) Foreign Application Priority Data

Mar. 20, 1998 (JP) .......................................... 10-071691

(51) Int. Cl.$^7$ ................................................. G11B 7/00
(52) U.S. Cl. ...................... 369/275.2; 369/13; 428/64.1
(58) Field of Search ............................. 369/275.2, 118, 369/109.01, 284, 288, 44.12, 44.23, 13, 283, 112.01, 112.02, 112.18, 112.22, 285, 286; 428/64.1, 64.8, 64.2, 64.4, 64.5, 64.6; 430/270.13, 495.1, 945

(56) References Cited

U.S. PATENT DOCUMENTS

| | | | | |
|---|---|---|---|---|
| 5,153,873 A | * | 10/1992 | Spruit et al. | 369/275.2 |
| 5,474,874 A | * | 12/1995 | Asai et al. | 430/275 |
| 5,591,500 A | * | 1/1997 | Kawanishi | 428/64.1 |
| 5,717,662 A | * | 2/1998 | Nishimura | 369/13 |
| 6,111,822 A | * | 8/2000 | Miyake | 369/13 |
| 6,181,650 B1 | * | 1/2001 | Ichihara | 368/13 |
| 6,187,406 B1 | * | 2/2001 | Ichihara et al. | 428/64.1 |

FOREIGN PATENT DOCUMENTS

| | | |
|---|---|---|
| JP | 5-225611 | 9/1993 |
| JP | 7-72567 | 3/1995 |

\* cited by examiner

*Primary Examiner*—David Hudspeth
*Assistant Examiner*—Kim-Kwok Chu
(74) *Attorney, Agent, or Firm*—Oblon, Spivak, McClelland, Maier & Neustadt, P.C.

(57) ABSTRACT

An optical disk having a recording layer onto which light is irradiated to perform recording/reproducing of information, comprising a super-resolution film for recording and a reflective film which are formed in the side opposite to the light entering side with respect to the recording layer, and a super-resolution film for reproduction formed in the light entering side with respect to the recording layer.

15 Claims, 4 Drawing Sheets

OPTICAL DISK AND RECORDING/REPRODUCING METHOD THEREOF

BACKGROUND OF THE INVENTION

The present invention relates to an optical disk on and from which information is recorded and reproduced by irradiating a light beam and also to a recording/reproducing method thereof.

An optical disk memory which achieves reproducing or recording/reproducing of information by irradiation of a light beam has been put into practical use as a storage medium for audio, video and computer data files which realizes a large capacity, high-speed access, and portability. The optical disk memory is therefore expected to develop more in the future. High-density techniques for an optical disk are considered to involve shortening of the wavelength of a gas laser for cutting a master disk, shortening of the wavelength of a semiconductor laser as an operating light source, improvement of the numerical aperture of an objective lens, and thinning of an optical disk. Further, in a recordable optical disk, there are much more various approaches such as mark length recording, land-groove recording, and the like.

As a technique capable of effectively achieving high-density of an optical disk, a proposal has been made as to a super-resolution reproduction technique which utilizes medium films. The super-resolution reproduction technique has originally been proposed as a technique peculiar to a magneto-optical disk. In the super-resolution reproduction technique for a magneto-optical disk, a magnetic film (or super-resolution film) is provided in the incident side of a reproduction beam with respect to a recording layer, and both of the super-resolution film and the recording layer are exchange-coupled or magneto-statically coupled. Then, a reproduction beam is irradiated to increase the temperature of the super-resolution film thereby to change the exchange force or magneto-static force so that an optical mask or an optical aperture is formed in the super-resolution film. The super-resolution reproduction is thus realized.

Thereafter, reports were made as to attempts to provide a super-resolution film whose transmittance changes due to irradiation of a reproduction beam in the incident side of the reproduction beam with respect to a recording layer to perform super-resolution reproduction in case of a ROM disk in addition to a magneto-optical disk. Thus, it has been revealed that the super-resolution reproduction technique is applicable to all optical disks including a magneto-optical disk, CD-ROM, CD-R, WORM, phase change optical disk, and the like.

Super-resolution reproduction techniques are classified into a heat mode system and a photon mode system. Explanation will now be made as for examples of conventional super-resolution films which have already been proposed.

In the heat mode system, a phase change material is used as a super-resolution film. The super-resolution film is heated by irradiation of a reproduction beam to cause a phase change so that an optical aperture smaller than the reproduction beam spot is formed. The shape of the optical aperture follows the isotherm of the super-resolution film. However, since the size of the optical aperture easily changes due to influences from the environmental temperature, it is necessary to perform heat control strictly in compliance with the linear velocity of the optical disk. In addition, it is difficult to obtain sufficient repetition stability in the super-resolution film of the heat mode system because of thermal fatigue caused by reproduction and recording.

In the photon mode system, a photochromic material is used as a super-resolution film, and development or erasure of color based on irradiation of a reproduction beam is utilized to form an optical mask or an optical aperture. In the photochromic material, electrons are excited from a ground level to a excitated level of short lifetime by irradiation of light, and further, electrons are transmitted from the excited level to a metastable excitated level of very long lifetime in which they are captured thereby to cause a change of light absorption characteristics. Therefore, in order to perform reproduction repeatedly, electrons captured at the metastable excitated level must be deexcited to the ground level so that the optical aperture may be closed. However, since a supplemental beam is irradiated for the deexcitation, two-beam operation is required disadvantageously in view of high-speed response. Also, the photochromic material causes transmittance change through complicated processes accompanying atomic migration or change in molecular bond, and therefore, the repetition stability is limited up to about 10,000 times.

As described above, to realize super-resolution reproduction of an optical disk, it is required that the transmittance change of the super-resolution film is caused within the range of practical reproduction power, the degree of change is large, an optical aperture can be formed within a short time equivalent to about the passing time of the reproduction beam spot, and repetitive reproduction can be performed many times. However, a conventional super-resolution film cannot meet all of those requirements.

Further, super-resolution recording has hardly been proposed although super-resolution reproduction has been studied. That is, recording marks recorded at a shortened interval can be reproduced at high resolution by super-resolution reproduction, while very small recording marks conventionally cannot be formed because the size of the recording mark is determined by the spot size of the recording beam.

BRIEF SUMMARY OF THE INVENTION

An object of the present invention is to provide an optical disk capable of super-resolution recording by forming a recording mark smaller than the spot size of a recording beam defined by the wavelength of a light source and the NA of a focusing lens. Another object of the present invention is to provide an optical disk capable of super-resolution recording and also capable of super-resolution reproduction by which fine recording marks formed at a fine mark pitch can be reproduced with high resolution.

An optical disk according to the present invention has a recording layer onto which light is irradiated to perform recording/reproducing of information, and comprises a super-resolution film for recording film in which an optical aperture smaller than a spot size of a recording beam is formed by irradiating the recording beam.

In the optical disk according to the present invention, it is preferable that the super-resolution film for recording and a reflective film are provided in a side opposite to a light entering side of the recording layer into which a light beam enters. Also, it is preferable that the super-resolution film for recording and the reflective film are provided in a side opposite to a light entering side of the recording layer into which a light beam enters, and a super-resolution film for reproduction is provided in the light entering side of the recording layer.

Further, it is preferable that the super-resolution film for recording and the super-resolution film for reproduction are made of semiconductor films or semiconductor particle dispersed films which have a characteristic that absorbance thereof decreases due to light excitation, and semiconductor forming the super-resolution film for recording is adjusted to have a lower light excitation probability than semiconductor forming the super-resolution film for reproduction.

In a method of recording/reproducing with respect to an optical disk having a recording layer, a super-resolution film for recording, and a super-resolution film for reproduction, according to the present invention, recording is performed by irradiating a light beam of an intensity at a recording level thereby to form a smaller optical aperture in the super-resolution film for recording than a spot size of the light beam, and by forming a recording mark having a size corresponding to the formed optical aperture, in the recording layer, and reproduction is performed by irradiating a light beam of an intensity at a reproduction level thereby to form a smaller optical aperture in the super-resolution film for reproduction than a spot size of the light beam, and by reading out a recording mark formed in the recording layer, through the formed optical aperture.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
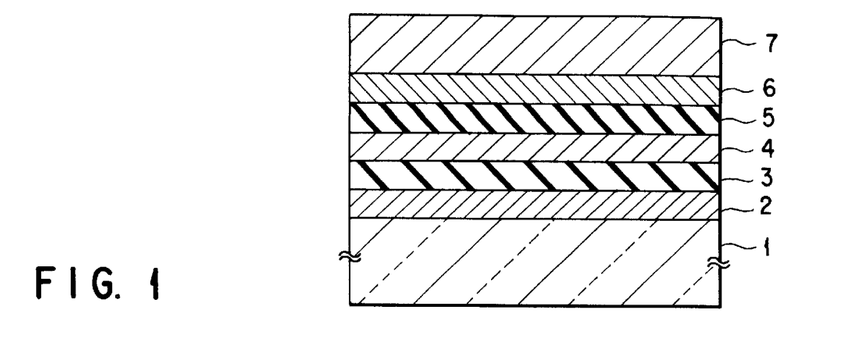
FIG. 1 is a cross-sectional view showing an example of an optical disk according to the present invention.

FIG. 1 shows an example of the structure of an optical disk according to the present invention. On the optical disk 1, a super-resolution film for reproduction 2, a first interference film 3, a recording layer 4, a second interference film 5, a super-resolution film for recording 6, and a reflective film 7 are formed. In case of this optical disk, the super-resolution film for reproduction 2 is formed in the light entering side in which a light beam enters of the recording layer 4 while the super-resolution film for recording 6 is the side opposite to the light entering side.

Figure 2:
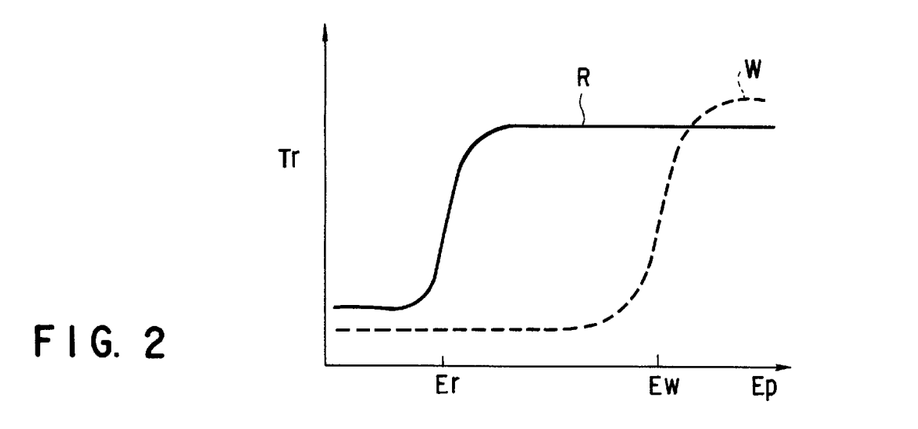
FIG. 2 is a graph showing a relationship between irradiated photon number density and transmittance with respect to a super-resolution film for reproduction and a super-resolution film for recording.

FIG. 2 shows a curve (R) showing relationship between transmittance (Tr) of the super-resolution film for reproduction 2 and irradiation photon number density (Np), and a curve (W) showing relationship between transmittance (Tr) of the super-resolution film for recording 6 and the irradiation photon number density (Np). Note that the abscissa in FIG. 2 can be replaced with the film temperature if the super-resolution film is a heat mode material.

The super-resolution film for reproduction 2 shows low transmittance within a range in which the irradiation photon number density is lower than the photon number density (Nr) during reproduction, but shows high transmittance within a range in which the irradiation photon number density is higher than Nr. This means that an optical aperture smaller than the spot size can be formed in the region of the super-resolution film for reproduction 2 corresponding to the central portion of the reproduction beam spot by appropriately setting the reproduction power. Further, the reproduction beam reaches the recording layer 4 through the optical aperture and is reflected therefrom, and therefore, super-resolution reproduction can be realized by detection the reflected light therefrom. The super-resolution film for reproduction 2 may be referred to as a masking film for super-resolution reproduction because of the above functions.

Meanwhile, the super-resolution film for recording 6 shows low transmittance within a range in which the irradiation photon number density is lower than photon number density (Nw) during recording, but shows a high transmittance within a range in which the irradiation photon number density is higher than Nw. This means that an optical aperture smaller than the spot size can be formed in the region of the super-resolution film for recording 6 corresponding to the central portion of the reproduction beam spot by appropriately setting the reproduction power. Further, the recording beam reaches the reflective film 7 through the optical aperture and returns to the recording layer 4 through the optical aperture. As a result, the recording layer 4 is sufficiently heated so that formation of a fine recording mark, i.e., super-resolution recording is enabled in case of the heat mode recording. The super-resolution film for recording 6 may be referred to as a masking film for super-resolution recording because of the above functions.

In the optical disk, the power of the recording beam is adjusted such that the recording layer 4 is not sufficiently heated (i.e., recording is not enabled) by the recording beam (or primary light) which directly enters into the recording layer 4. More specifically, the power of the primary beam and the power of the light which passes through the recording layer 4, reaches the reflective film 7 through the optical aperture formed in the super resolution film for recording 6, and is then reflected therefrom are added together thereby to enable recording.

In the present invention, as shown in FIG. 1, it is most preferred that the super-resolution film for recording and the super-resolution film for reproduction are provided in both sides of the recording layer. However, since the various conditions may be considered as for the relationship between the transmittance and the photon number density with respect to the super-resolution film for recording and the super-resolution film for reproduction, it may be possible to provide both super-resolution films on the same side relative to the recording layer.

Although it is most effective to realize high density in case where the super-resolution recording and the super-resolution reproduction are combined together, it is sufficient for the present invention to provide only the super-resolution film for recording so that the super-resolution recording is realized. For example, a high density recording/reproducing system can be constructed if it is operated such that a sequence of fine marks which are super-resolution-recorded with a long-wavelength laser beam of high output power can be reproduced with a short-wavelength laser beam of low output power.

In the present invention, the material of the super-resolution film for recording and the super-resolution film for reproduction film may be selected from heat mode material such as a phase change film or heat fading dye having a high crystallization speed, or photon mode material such as photochromic material, photo-breaching material, semiconductor, or a semiconductor particle dispersed film.

Figure 3:
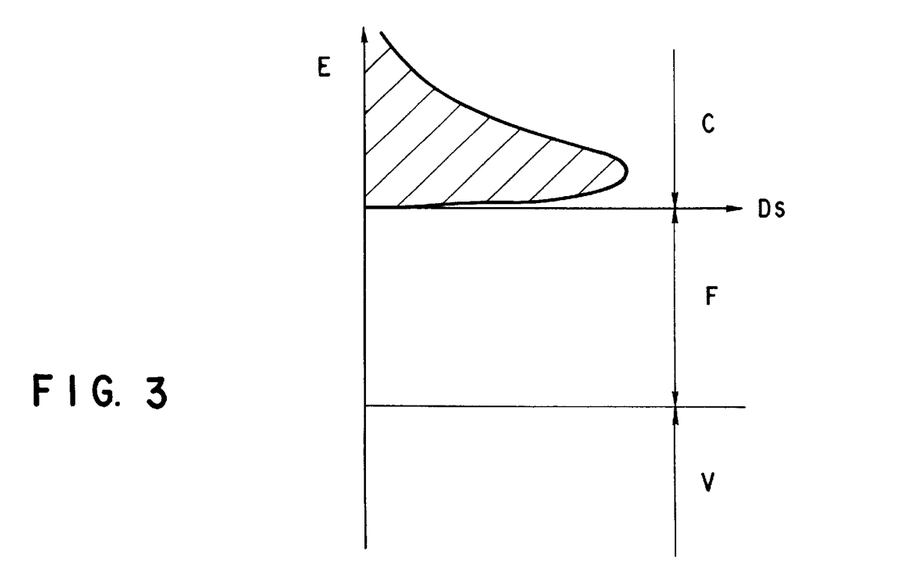
FIG. 3 is a graph showing an energy level of semiconductor and a state density function.

The most preferable material for the present invention is a continuous film of semiconductor or a semiconductor particle dispersed film. With use of these films, an absorption saturation phenomenon caused by irradiation of light is utilized to achieve super-resolution operation. With reference to FIG. 3, absorption saturation will be simply explained below. FIG. 3 is a graph schematically showing the energy level of semiconductor and the state density function. In this figure, the coordinate indicates energy E while the abscissa indicates the state density function Ds. References V, F, and C respectively denote a valence band, a forbidden band, and a conduction band. When light with higher energy than the forbidden band width is irradiated on semiconductor, light is absorbed so that electron excitation occurs from the valence band to the conduction band. The probability of the electron excitation becomes higher as the vacant state density in the conduction band is high. Meanwhile, as the irradiated photon number density increases, the number of electrons excited from the valence band increases while the vacant state density in the conduction band decreases. Specifically, as indicated by hatching in FIG. 3, most of the state is occupied by excited electrons. That is, light is absorbed when the photon energy is low. However, as the photon energy becomes higher, light is less absorbed and the transmittance increases. The intensity distribution of the light beam used for recording/reproducing has Gaussian distribution, and the intensity is high at the central portion of the beam spot but is low at the peripheral portion. Therefore, the transmittance is high at the central portion of the beam spot but is low at the peripheral portion so that the super-resolution operation is enabled.

In the present invention, when the super-resolution film for recording and the super-resolution film for reproduction both of which are made of continuous films of semiconductor or semiconductor particle dispersed films are used together, the light excitation probability of the semiconductor forming the super-resolution film for recording is adjusted to be lower than that of the semiconductor forming the super-resolution film for reproduction. In other words, the photon number density by which the super-resolution film for recording causes absorption saturation is set to be higher than the photon number density by which the super-resolution film for reproduction causes absorption saturation. To adjust the photon number density which achieves the absorption saturation, the semiconductor material to be used is selected in compliance with the wavelength or the size and the volume content of fine particles are adjusted so as to control the lifetime of deexcitation and the excitation probability.

As shown in FIG. 3, the state density of vacant state is highest near the lower end of the conduction band, and attenuates when the energy increase much more.

Therefore, when semiconductor having a somewhat narrower forbidden band width than that corresponding to the operating wavelength is selected as the material forming the super-resolution films, the excitation probability becomes highest so that absorption saturation can be achieved with low photon number density. Inversely, when semiconductor having much narrower than that corresponding to the operating wavelength is selected, the photon number density necessary for absorption saturation can be increased since electron excitation to a state of high energy shown in FIG. 3 occurs at first and then excited electrons move into the state at the lower end of the conduction band. In addition, since the transition probability differs depending on the kinds of semiconductor even when those semiconductors have an equal forbidden band width, the differences between their transition probability can be used to adjust the photon number density which causes absorption saturation.

To finely control the forbidden band width and the width of the state density function of the conduction band, it is preferable to use the fine particle effect of semiconductor. As the fine particles of semiconductor are isolated, the forbidden band width is enlarged and the state density function becomes narrow and sharp. In addition, the photon number density which achieves absorption saturation can be adjusted by the deexcitation lifetime. For example, if the deexcitation lifetime is short (e.g., in case of a continuous film or particles having a large size), the photon number density which achieves absorption saturation can be high. Inversely, if the deexcitation lifetime is long (e.g., in case of particles having a small size), the photon number density which achieves absorption saturation can be low.

In the present invention, the semiconductor material used as super-resolution films may be selected from Cu halide, Ag halide, Cu oxide, AgSe, AgTe, SrTe, SrSe, CaSi, ZnS, ZnO, ZnSe, ZnTe, CdS, CdSe, CdTe, AlTe, InS, InO, InSe, InTe, AlSb, AlN, AlP, AlAs, GaN, GaP, GaTe, GaAs, GaSb, GeS, GeSe, SnS, SnSe, SnTe, PbO, Si, SiC, AsTe, AsSe, SbS, SbSe, SbTe, BiS, TiO, MnSe, MnTe, FeS, MOS, CuAlS, CuInS, CuInSe, CuInTe, AgInS, AgInSe, AgInTe, CdGeP, ZnSiAs, ZnGeP, CuSbS, CuAsS, AgSbS, AgAsS, and the like.

Table 1 shows forbidden band width (Eg) of typical semiconductor materials (continuous films) and wavelength ($\lambda$g) of light corresponding thereto.

TABLE 1

| | Eg (eV) | λg(nm) |
|---|---|---|
| ZnO | 3.44 | 360 |
| ZnS | 3.84–3.91 | 317–324 |
| ZnSe | 2.83 | 438 |
| ZnTe | 2.39 | 519 |
| CdS | 2.5–2.6 | 477–496 |
| CdSe | 1.84 | 674 |
| CdTe | 1.607 | 772 |
| AlP | 2.5 | 496 |
| AlSb | 1.55 | 800 |
| AlAs | 2.3 | 539 |
| GaN | ≈3.76 | ≈330 |
| GaAs | 1.35 | 919 |
| GaP | 2.35 | 528 |
| Si | 1.12 | 1107 |
| SiC | 2.8 | 443 |

When recording and reproduction are performed by using a red laser beam, it is preferable to use semiconductors such as CdTe, GaTe, AlSb, GeS, SbS, CdGeP, AgInS, CdSe, CuO, CaSi, GaSe, AgInSi and AgSbS in a super-resolution film.

When recording and reproduction are performed by using a blue laser beam, it is preferable to use semiconductors such as CdS, ZnSe, GaS, InO, AlP, PbO, CuAlS, GaS, InO and SiC in a super-resolution film.

Matrix material used for dispersing semiconductor fine particles may be selected from transparent dielectric material such as $SiO_2$, $Si_3N_4$, $Ta_2O_5$, $TiO_2$, and $ZnS-SiO_2$, hydrocarbon-based or fluorocarbon-based plasma polymerization product material, carbon, and the like.

The semiconductor particle dispersed film is formed such that the average particle size of the semiconductor particles is 1 to 50 nm, more preferably 1 to 40 nm, and the volume content thereof is 15 to 85, more preferably 15 to 75%.

Preferable average particle size and volume content of the semiconductor particles in a semiconductor particle dispersed film will be described below. Here, description is made with respect to a super-resolution film made of a GaTe particle dispersed film.

A laser beam having a wavelength of 650 nm is irradiated in a form of pulse onto the super-resolution film so as to investigate the time response of transmittance by making use of a time-resolved spectrum analyzer. It is found that when the volume content of GaTe is 80 vol % or more (including 100 vol %, i.e., a continuous film), the excitation efficiency is poor irrespective of the particle size so that it is impossible to obtain a property that transmittance varies quickly. The reason for this is ascribed to the fact that the semiconductor fine particles are connected to each other to form a network-like structure, thus making the energy gap of the super-resolution film close to that of a continuous film. The film having such a high volume content of GaTe is not suitable to the super-resolution reproduction for optical disk. The film whose volume content of GaTe is less than 15 vol % indicates a desired property regarding transmittance change with time. However, when the particle size is relatively small even though the volume content of GaTe thereof is less than 15 vol %, it requires several minutes or more for the transmittance which has been raised as a result of the pulse irradiation to return to the initial level. The reason for this is assumed that Stark effect has been taken place preferentially. When the volume content of GaTe in the film is less than 5 vol %, even the magnitude of transmittance change due to the Stark effect is insufficient.

The above Stark effect is a phenomenon that the ground level and the excited level are disturbed (more precisely, the wave function of electron exists in each level is distorted) due to the electric field of the irradiated light, so that the wavelength for transition from the ground level to an excited level is caused to shift. In this case, the electrons in the ground level are not exhausted by irradiation of light, but the absorption coefficient due to electron transition to a specific excited level is lowered and the absorption coefficient due to electron transition to another excited level is increased. Since the Stark effect becomes more prominent as the photo-electric field becomes stronger, the absorbance to a specific wavelength becomes extremely small in the vicinity of the central portion of the light spot, by which an optical aperture is formed. However, in the case of a continuous film or when fine particles are associated with each other, an excited electron tends to move to the neighboring fine particle, so that the Stark effect is hardly expected. Namely, the Stark effect preferentially takes place only when the fine particles are sufficiently dispersed.

By contrast, when the GaTe volume content is not more than 80 vol % and the fine particles have an appropriate particle size without associated not so much, the absorption saturation mainly takes place, thus making it possible to obtain a practical magnitude of change in transmittance and a suitable time response. If the particle size is too large, the time constant of deexcitation is shortened. This is because the effect to maintain stably the excited level by making particles fine is reduced. The lower limit of the particle size is 2 to 3 nm which renders the Stark effect to take place preferentially.

Figure 4:
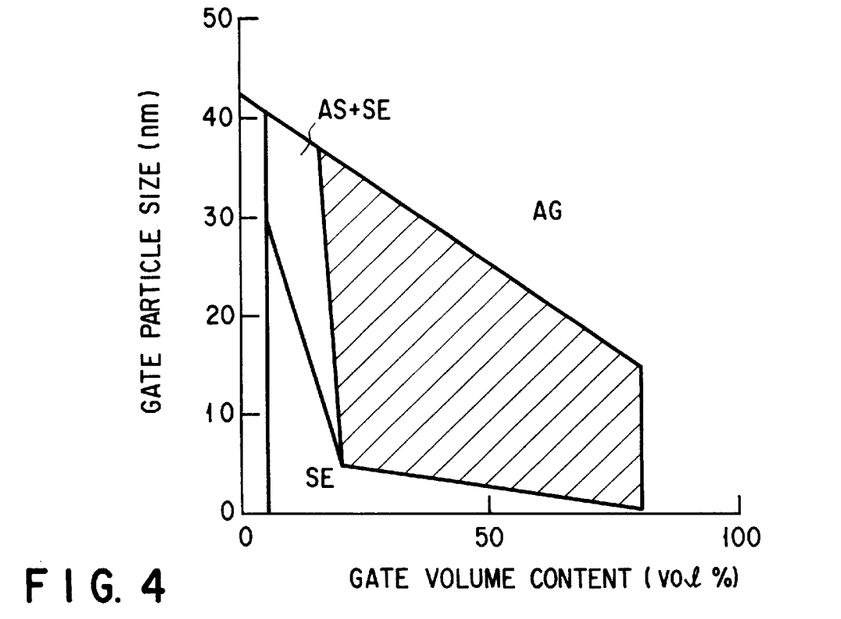
FIG. 4 is a diagram showing a relationship between the volume content of GaTe particles and the particle size of the GaTe particles of a semiconductor particle dispersed film.

FIG. 4 shows a region where 10% or more of transmittance change and several tens nanometers or more of time constant of deexcitation can be obtained in a super-resolution film in which GaTe fine particles are dispersed in the $SiO_2$ matrix, with the abscissa indicating the volume content and the ordinate indicating the particle size of the particles. In this figure, a region where the absorption saturation takes place preferentially and a desired time response can be obtained is shown by hatching. The region is located below the line passing a point where the volume content is 80 vol % and the particle size is 18 nm, a point where the volume content is 50 vol % and the particle size is 25 nm, and a point where the volume content is 15 vol % and the particle size is 38 nm. This figure also shows a region (AG) where the association of particles is prominent; a region (AS+SE) where both the absorption saturation and the Stark effect take place; a region (SE) where the Stark effect takes place preferentially; and a region (NG) where substantially no change in transmittance can be seen.

Figure 5:
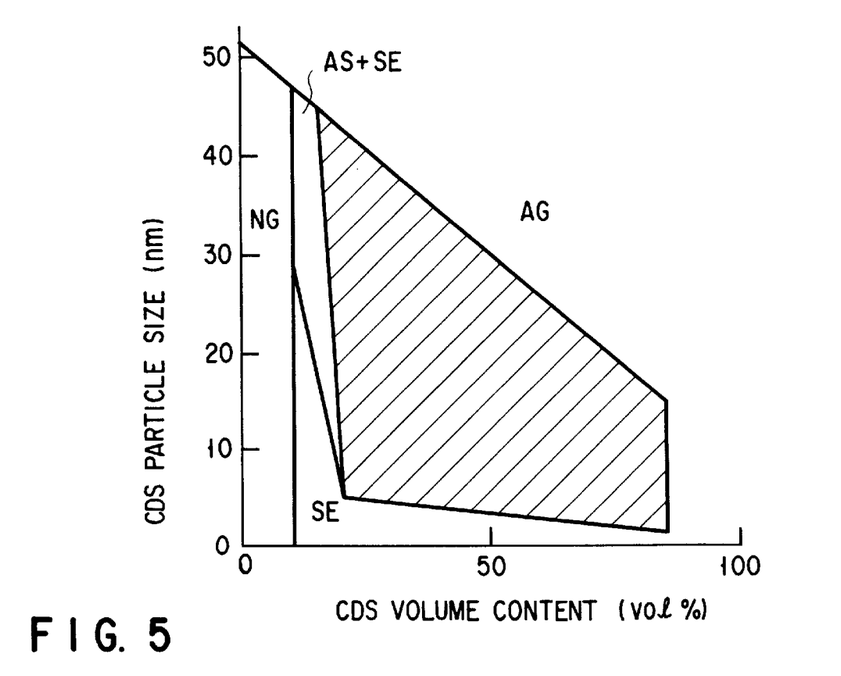
FIG. 5 is a diagram showing a relationship between the volume content of CdS particles and the particle size of the CdS particles of another semiconductor particle dispersed film.

FIG. 5 shows a similar relationship as that shown in FIG. 4 with respect to a super-resolution film in which CdS fine particles are dispersed in the $SiO_2$ matrix when a blue laser beam is used. The region where 10% or more of transmittance change and several tens nanometers or more of time constant of deexcitation can be obtained, is located below the line passing a point where the volume content is 85 vol % and the particle size is 15 nm, a point where the volume content is 50 vol % and the particle size is 30 nm, and a point where the volume content is 20 vol % and the particle size is 40 nm.

Further, in order to cause absorption saturation effectively in a semiconductor constituting the super-resolution film, foreign materials mixed in the semiconductor should be as little as possible. Examples of foreign materials include a matrix material and/or contamination. In the present invention, it is necessary that the content of the matrix material and/or contamination mixed in the semiconductor fine particles or the semiconductor continuous film is not more than 20 at %. In addition, it is preferable that the content of the semiconductor material in the matrix of the semiconductor particle dispersed film is not more than 20 at %.

Note that the other materials which may be used for the optical disk of the present invention is not limited particularly. Examples of material for interference film are transparent dielectric material such as $SiO_2$, $Si_3N_4$, $Ta_2O_5$, $TiO_2$ and ZnS—$SiO_2$. The material usable for the recording layer may be selected from magneto-optical material such as TbFeCo, GdFeCo, Pt/Co, MnBi and garnet-ferrite; phase change recording material represented by GeSbTe and AgInSbTe; and photon-mode recording material represented by photochromic material. The material usable for the reflective film may be metal material having a high reflectance represented by Al alloy, Au, Cu, and Ag. Otherwise, it is possible to use semitransparent material which allows a part of light to pass but reflects another part of light. The semitransparent film may be provided between the substrate and the first interference layer or may be provided in place of the reflective film.

EXAMPLES

Examples of the present invention will be described with reference to the drawings.

Example 1

Figure 6:
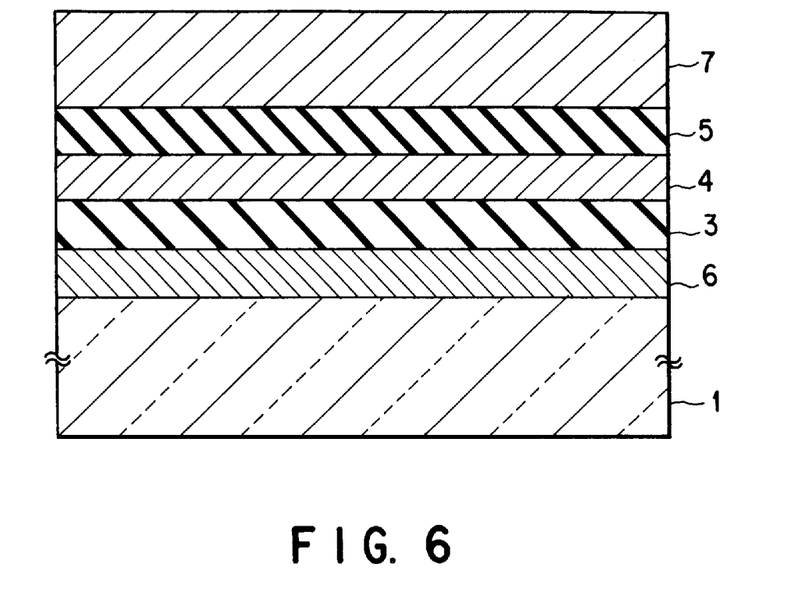
FIG. 6 is a cross-sectional view of an optical disk according to Example 1.

FIG. 6 shows a cross-sectional view of an optical disk (DVD-RAM) according to the present example. A super-resolution film for recording 6, a first interference film 3, a recording layer 4, a second interference film 5, and a reflection film 7 are formed on an optical disk substrate 1.

This optical disk is manufactured as follows. With use of a conventional optical disk substrate process, an optical disk 1 provided with a tracking guide groove is prepared by a mastering process, stamper process, and injection process. Thereafter, the following layers are formed by magnetron sputtering. At first, GaTe and $SiO_2$ are subjected to binary co-sputtering to form a super-resolution film for recording 6 having a thickness of 100 nm and made of a GaTe particle dispersed film in which GaTe fine particles having an average particle size of 3 nm are dispersed at a volume content of 50 vol % in an $SiO_2$ matrix. Next, a first interference film 3 having thickness of 120 nm and made of ZnS—$SiO_2$, a recording layer 4 having a thickness of 20 nm and made of GeSbTe, a second interference film 5 having a thickness of 30 nm and made of ZnS—$SiO_2$, and a reflective film 7 having a thickness of 60 nm and made of Al alloy are sequentially formed.

On the other hand, as a comparative example, an optical disk without a super-resolution film for recording 6 is manufactured.

The super-resolution film for recording 6 will be specifically described below. In case of using semiconductor for the super-resolution film for recording film, designing in compliance with the operating wavelength is important. In the present embodiment, a red laser beam having a wavelength of 650 nm is used. Therefore, use is made of a semiconductor which has a forbidden band width somewhat narrower than 1.91 eV, equivalent to light energy of wavelength of 650 nm, and which causes absorption saturation by high photon number density equivalent to recording power. In this case, a preferable forbidden band width is 1.5 to 1.8 eV. Examples of semiconductor having such a forbidden band width will be CdTe, GaTe, AlSb, GeS, SbS and CdGeP. In the present example, GaTe having a forbidden band width of 1.7 eV, equivalent to light energy of a wavelength of 730 nm, is selected.

As described above, the super-resolution film for recording 6 is made of a GaTe particles dispersed film in which GaTe fine particles having an average size of 3 nm are dispersed at a volume content of 50 vol % in a of $SiO_2$ matrix. The purpose of making particles fine is to lengthen the deexcitation lifetime, i.e., the time taken for electrons once excited to an upper level being deexcited to a lower level, thereby to prevent the degree of transmittance change from being decreased. With fine particles of about 3 nm, the deexcitation lifetime becomes as sufficiently long as about 20 to 30 ns. To improve the degree of transmittance change, it is advantageous to make the volume content higher. However, if the volume content is too high, fine particles are connected to form a network, so that the effect to lengthen the deexcitation lifetime is reduced. Therefore, it is appropriate that the volume content be set to about 50 vol %. Note that the degree of transmittance change can be adjusted by the film thickness other than the volume content. In addition, by making grains fine, an effect of increasing the forbidden band width. If the particles are made fine to a size of about 3 nm, the forbidden band width is broaden by about 20 meV. The substantial forbidden band width of the super-resolution film for recording 6 in this example is 1.72 eV, which is equivalent to 721 nm in wavelength. This super-resolution film for recording shows the maximum excitation provability at about 1.75 to 1.8 eV, equivalent to light energy of wavelength of 709 to 689 nm, and therefore, the excitation provability is lowered at the operating wavelength 650 nm. That is, the super-resolution film for recording is adjusted so as to cause absorption saturation occurs at a relatively high photon number density of a recording power level.

In this example, since the wavelength of the recording beam ($\lambda$) is 650 nm and the NA of the focusing lens is 0.6, the spot size on the disk surface is about 0.5 $\mu$m in full width at half maximum (W). Where the linear velocity of the disk during recording operation is V (m/s), the time ($\tau$) when the FWHM of the beam spot passes the disk surface is 0.5/V ($\mu$s). The linear velocity V is set to 6 m/s in the present example.

Where the power of the recording beam is Pw (mW), the photon number density N (J/cm$^2$) entering the super-resolution film for recording 6 is obtained by the following equation.

$$N = \frac{pw \times \tau p \times 10^{-9}}{\pi \times (W/2)^2 \times 10^{-8} \times (1240/\lambda) \times 1.6 \times 10^{-19}}$$

In the above equation, the numerator indicates the irradiation energy (in unit of J). In the dominator, $\pi \times (W/2)^2 \times 10^{-8}$ indicates the spot area (in unit of cm$^2$), (1240/$\lambda$) indicates the energy per photon (in unit of eV), and $1.6 \times 10^{-19}$ indicates the conversion coefficient from eV to J (J/eV). If numerical values actually used in this example are substituted in the above formula, $N=1.38 \times 10^{17} \times Pw$ (cm$^{-2}$). Since Pw of 10 to 15 mW is normally used, N is about $14 \times 10^{17}$ to $21 \times 10^{17}$ (cm$^{-2}$). The optical disk of this example is adjusted such that the super-resolution film for recording achieves absorption saturation at about $N=15 \times 10^{17}$ cm$^{-2}$ on the basis of the above calculation. Also, since the lifetime of deexcitation is adjusted to about 20 to 30 ns, influences from deexcitation are small within the spot passing time (83 ns) so that a large transmittance change can be obtained.

Time response measurement of transmitted light intensity is carried out with respect to a super-resolution recording film of a single layer having a thickness of 100 nm, by irradiating a laser beam from a tunable laser. In this time, the laser power, the irradiation time, and the spot size are adjusted such that the irradiated photon number density becomes equal to the value in actual recording operation. As a result, with respect to light of 650 nm, the transmittance is about 20% when N is smaller than $10\times10^{17}$ cm$^{-2}$, and the transmittance is about 70% when N is about $20\times10^{17}$ cm$^{-2}$.

Figure 7A:
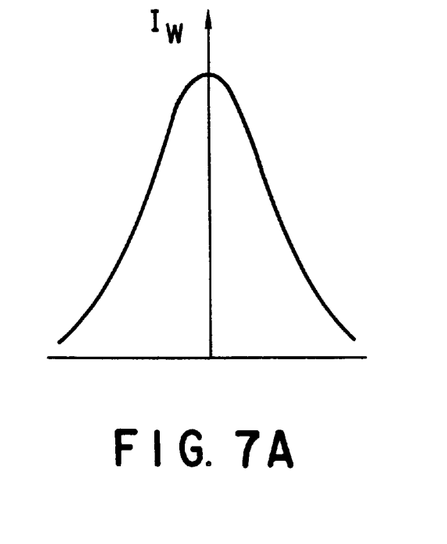
FIG. 7A is a graph showing a light intensity distribution of a laser beam which enters into a super-resolution film for recording where a laser beam with Gaussian distribution is irradiated on the super-resolution film for recording.
Figure 7B:
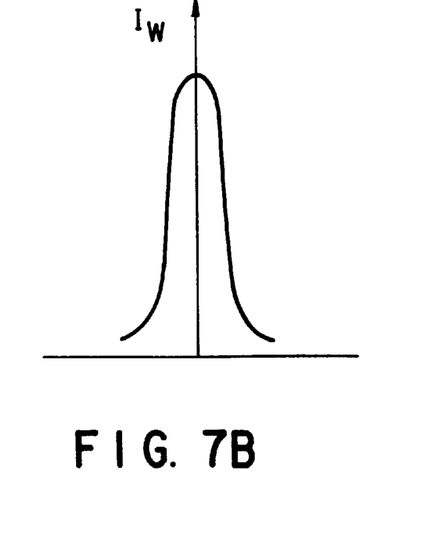
FIG. 7B is a graph showing a light intensity distribution of a laser beam after the laser beam has passed through a super-resolution film for recording where a laser beam with Gaussian distribution is irradiated on the super-resolution film for recording.

FIGS. 7A and 7B schematically show the light intensity distribution where a laser beam having Gaussian distribution is irradiated on the super-resolution film for recording. FIG. 7A shows the light intensity distribution of the laser beam entering the super-resolution film and FIG. 7B shows the light intensity distribution of the laser beam after passing the super-resolution film. As shown in FIG. 7B, the light beam is reduced due to a super-resolution effect, and the substantially same effect as obtained when using a short-wavelength laser or an objective lens having a high NA. It is hence found that recording marks smaller than the spot size can be formed.

Figure 8:
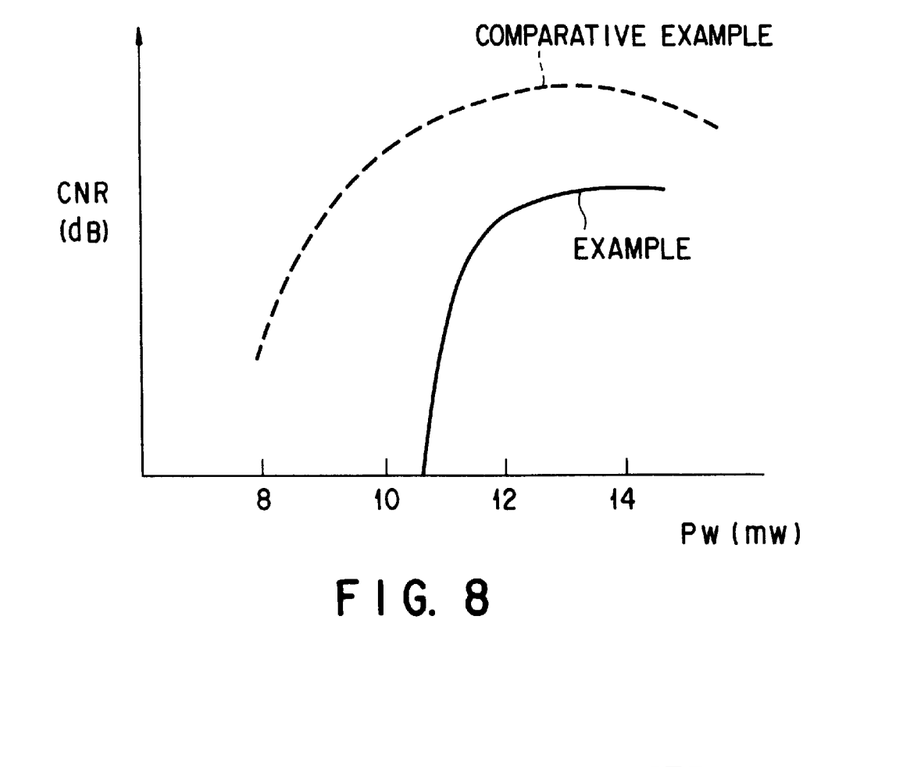
FIG. 8 is a graph showing a relationship between recording power and CNR in the optical disk according to the present invention.

Next, the optical disk shown in FIG. 6 is set in a disk evaluation apparatus and is then driven at a linear velocity of 6 m/s. A laser beam having a wavelength of 650 nm is irradiated through an objective lens having NA of 0.6 from the substrate side. An experiment is thus carried out to form fine recording mark trans. At first, a sequence of marks having a bit pitch of 0.41 $\mu$m/bit and a mark length of 0.62 $\mu$m are formed with a single frequency while changing the recording power. Thereafter, a reproduction beam having a wavelength of 650 nm, same as in recording, is irradiated through an objective lens having NA of 0.6 to evaluate CNR. The result is shown in FIG. 8. This figure shows the result of the example together with a comparative example having no super-resolution recording film.

With respect to the threshold value power for recording, the threshold value is shifted to the side of higher power in the example compared with that in the comparative example, and rising of the CNR of the example beyond the threshold value is sharper than that of the comparative example. This depends on the characteristics of the super-resolution film for recording provided for the optical disk of the example. In the optical disk of the example, when the power of the recording beam is low, the transmittance of the super-resolution film for recording is low so that the recording beam does not reach the recording layer. However, as the power of the recording beam increases, the super-resolution film for recording causes absorption saturation so that the transmittance sharply rises and the recording beam reaches the recording layer, thereby making the rising of CNR sharp. In contrast, recording is enabled with low power in the optical disk of the comparative example.

With respect to the saturation CNR value, the saturation CNR value of the optical disk of the example is lower than that of the comparative example. This is because fine recording marks are formed only near the center of the light beam in the example while recording marks of a size approximately equal to FWHM of the laser beam spot are formed in the comparative example.

Figure 9:
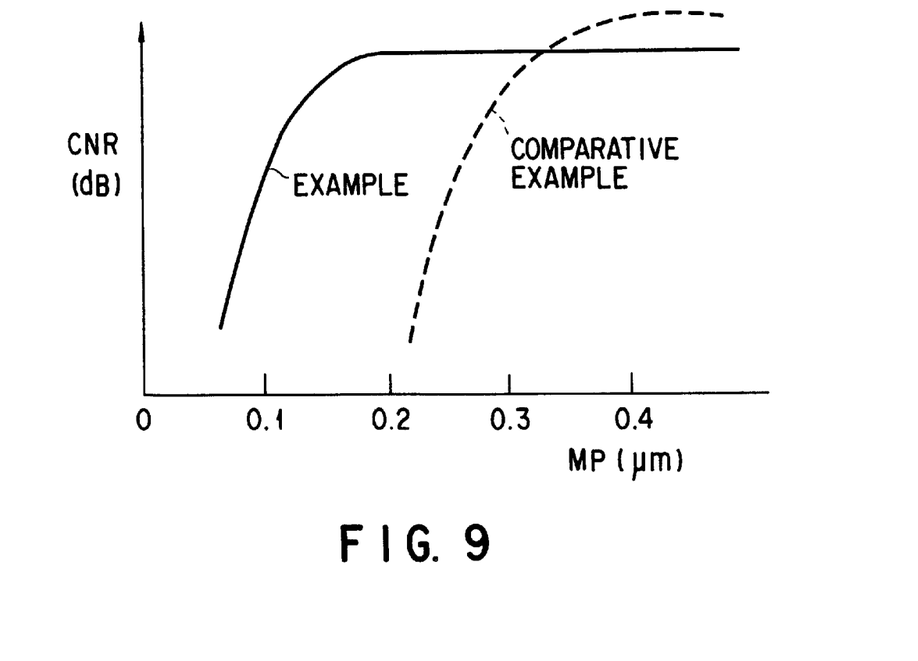
FIG. 9 is a graph showing a relationship between the mark pitch and CNR in the optical disk according to the present invention.

Next, FIG. 9 shows a result of an experiment in which recording is carried out with the recording mark pitch (MP) being changed on the same condition as described above and reproduction is thereafter carried out with a blue laser having a wavelength of 410 nm. The beam spot of the blue laser has FWHM of about 0.3 $\mu$m. Therefore, when the mark pitch is large, high CNR is obtained in both cases of the recording marks recorded by super-resolution recording in the example and the recording marks recorded in a conventional manner in the comparative example. However, in case where recording is carried out with a shortened mark interval in the optical disk of the comparative example, CNR suddenly drops when the mark pitch is about 0.3 $\mu$m, approximately equivalent to the spot size of the reproduction laser beam, due to influences from thermal interference during recording and inter-symbol interference during reproduction. In contrast, since the recording mark size is small in the optical disk of the example, the thermal interference during recording is small and the inter-symbol interference during reproduction is also small. Therefore, high CNR is maintained up to the mark pitch of about 0.15 $\mu$m.

As described above, high density can be achieved with use of an optical disk provided with a super-resolution film for recording, by combining super-resolution recording with a long-wavelength (red) laser and reproduction with a short-wavelength (blue) laser together.

Example 2

In the present example, explanation will be made of a case where single-laser operation is carried out with a red laser having a wavelength of 650 nm with use of an optical disk having a super-resolution film for recording and a super-resolution film for reproduction as shown in FIG. 1.

The optical disk in this example has a structure in which, on an optical disk 1 provided with a groove, there are formed a super-resolution film for reproduction 2 having a thickness of 100 nm in which AgInS fine particles are dispersed in an SiO$_2$ matrix, a first interference film 3 having a thickness of 150 nm and made of ZnS—SiO$_2$, a recording layer 4 having a thickness of 15 nm and made of GeSbTe, a second interference film 5 having thickness of 70 nm and made of ZnS—SiO$_2$, a super-resolution film for recording 6 having a thickness of 100 nm in which GaTe fine particles are dispersed in an SiO$_2$ matrix, same as in the example 1, and a reflective film 7 having a thickness of 100 nm and made of Al alloy. In case where a super-resolution film for recording 6 is provided in the side opposite to the entering side of the light beam with respect to the recording layer like this optical disk, the thickness of the recording layer 4 is set such that light sufficiently passes.

The super-resolution film for reproduction 2 will now be specifically described below. In the present example, AgInS having a forbidden band width of 1.9 eV, equivalent to light energy of a wavelength of 653 nm, is selected as semiconductor used for the super-resolution film for reproduction 2. AgInS fine particles having an average size of about 5 nm are dispersed in SiO$_2$ at a volume content of 50 vol %, thereby adjusting the lifetime of deexcitation of the super-resolution film for reproduction 2 to about 20 ns. This super-resolution film for reproduction 2 is formed by binary magnetron sputtering while applying a substrate bias for controlling the particle size. By making the particles fine the forbidden band width is slightly broadened and becomes 1.905 eV substantially equivalent to the energy of light of operating wavelength 650 nm.

Transmittance response is investigated with respect to the super-resolution reproduction film of a single layer having a thickness of 100 nm. As a result, the photon number density with which absorption saturation is achieved was about 1.5$\times10^{17}$ J/cm$^2$ and characteristics suitable for the reproduction power level was obtained.

Next, the optical disk shown in FIG. 1 is set in a disk evaluation apparatus and is then driven at a linear velocity of 6 m/s. A laser beam having a wavelength of 650 nm is irradiated through an objective lens having NA of 0.6 from the substrate side, thus recording/reproduction is carried out. Based on the result of the preliminary experiment, the recording power and the reproduction power are respectively set to 12 mW and 1.5 mW. Like in the example 1, recording is carried out with the mark pitch being changed, and thereafter, reproducing is carried out to evaluate CNR. As a result, the same characteristics as shown in FIG. 9 is obtained. That is, in this example, characteristics similar to the case of using a blue reproduction beam having a wavelength of 410 nm in the example 1 is obtained in spite of using a red reproduction beam having a wavelength of 650 nm.

In the optical disk of this example, a sufficiently large optical aperture is formed when a recording beam of high power is irradiated on the super-resolution film for reproduction 2. Therefore, only the super-resolution film for recording 6 functions during recording. In this optical disk, the super-resolution film for recording 6 is disposed in the side opposite to the entering side of the light beam with respect to the recording layer 4 because the transmittance of the super-resolution film for recording 6 is low during reproduction so that loss of the reproduction beam is caused if the super-resolution film for recording 6 is provided in the entering side of the light beam.

However, even in a state where the super-resolution film has a low transmittance, the transmittance never becomes zero since electron excitation due to light absorption is a stochastic process. Therefore, both the super-resolution film for recording and the super-resolution film for reproduction may be disposed in the entering side of the light beam with respect to the recording layer. If the super-resolution film for recording is disposed in the entering side of the light beam with respect to the recording layer, the reflective film need not be provided.

Example 3

In this example, explanation will be made of a case in which an optical disk having a super-resolution film for recording and a super-resolution film for reproduction as shown in FIG. 1 is used and single-laser operation is carried out with a blue laser, i.e., an Kr ion laser of a wavelength of 415 nm.

The optical disk of the this example is has the same structure as that of the optical disk of the example 2 except that the use is made of a super-resolution film for reproduction 2 in which ZnSe fine particles are dispersed in $SiO_2$ matrix and a super-resolution film for recording 6 in which CdS fine particles are dispersed in $SiO_2$ matrix.

As a semiconductor used for the super-resolution film for reproduction 2, ZnSe having a forbidden band width of 2.83 eV, equivalent to light energy of a wavelength of 438 nm is selected. ZnSe fine particles having an average size of about 4 nm are dispersed in $SiO_2$ at a volume content of 50 vol %, thereby adjusting the lifetime of deexcitation of the super-resolution film for reproduction 2 to about 15 ns. Transmittance response is investigated with respect to the super-resolution film for reproduction of a single layer having a thickness of 100 nm. As a result, the photon number density which causes absorption saturation is about $1 \times 10^{17}$ $cm^{-2}$ and characteristics suitable for the reproduction power level is obtained.

Further, as a semiconductor used for the super-resolution film for recording 6, CdS having a forbidden band width of 2.55 eV, equivalent to light energy of a wavelength of 486 nm, is selected. CdS fine particles having an average size of about 10 nm are dispersed in $SiO_2$ at a volume content of 40 vol %, thereby adjusting the lifetime of deexcitation of the super-resolution film for recording 6 to about 7 ns. Transmittance response is investigated with respect to a super-resolution film for recording of a single layer having a thickness of 100 nm. As a result, the photon number density with which absorption saturation is achieved is $12 \times 10^{17}$ $cm^{-2}$ and characteristics suitable for the reproduction power level is obtained.

Next, the optical disk is set in a disk evaluation apparatus and is then driven at a linear velocity of 6 m/s. A laser beam having a wavelength of 415 nm is irradiated through an objective lens having NA of 0.6 from the substrate side, thus recording/reproduction is carried out. Based on the result of the preliminary experiment, the recording power and the reproduction power are respectively set to 12 mW and 1.5 mW. Like in the example 1, recording is carried out with the mark pitch changed, and thereafter, reproducing is carried out to evaluate CNR. As a result, an excellent reproduction characteristic can be obtained. That is, it is found that excellent recording/reproduction can be performed with use of a blue laser beam of a wavelength of 415 nm.

As has been described above, the operating wavelength is not particularly limited in the present invention. If a semiconductor is used for super-resolution films, the forbidden band width of the super-resolution films can be appropriately adjusted. In addition, with respect to designing of materials suitable for a super-resolution film for recording and a super-resolution film for reproduction, it is possible to appropriately adjust the relationship between then as for the photon number density with which absorption saturation is achieved, by appropriately select the forbidden band width of the semiconductors and by controlling the size of fine particles.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk comprising a transparent substrate, and a super-resolution film for reproduction, a first interference film, a recording layer, a second interference film, a super-resolution film for recording, and a reflective film, which are formed in this order on the transparent substrate, wherein
   the super-resolution film for reproduction has characteristics that an optical aperture is formed in correspondence with a reproduction beam spot by irradiating the reproduction beam, and
   the super-resolution film for recording has characteristics that an optical aperture is formed in correspondence with a recording beam spot by irradiating the recording beam.

2. The optical disk according to claim 1, wherein
   the super-resolution film for recording has a structure in which fine particles of semiconductor, selected from the group consisting of CdTe, GaTe, AlSb, GeS, SbS, and CdGeP, are dispersed in a transparent dielectric matrix, and
   the super-resolution film for reproduction has a structure in which fine particles of semiconductor, selected from the group consisting of AgInS, CdSe, CuO, CaSi, GaSe, GeS, AgInSi and AgSbS, are dispersed in a transparent dielectric matrix.

3. The optical disk according to claim 2, wherein
the fine particles of semiconductor constituting the super-resolution film for recording and the super-resolution film for reproduction have an average particles size of 1 to 40 nm and a volume content of 15 to 75%.

4. The optical disk according to claim 2, wherein
the super-resolution film for recording film has a structure in which fine particles of semiconductor, selected from the group consisting of CdS, ZnSe, SIC, GaS, InO, AlP, PbO and CuAlS, are dispersed in a transparent dielectric matrix, and
the super-resolution film for reproduction has a structure in which fine particles of semiconductor, selected from the group consisting of ZnSe, GaS, InO and SiC, are dispersed in a transparent dielectric base material.

5. The optical disk according to claim 4, wherein
the fine particles of semiconductor constituting the super-resolution film for recording and the super-resolution film for reproduction have an average particles size of 1 to 40 nm and a volume content of 15 to 75%.

6. A method for recording/reproducing of an optical disk having a recording layer, a super-resolution film for recording, and a super-resolution film for reproduction, wherein
recording is performed by irradiating a light beam of an intensity at a recording level thereby to form a smaller optical aperture in the super-resolution film for recording than a spot size of the light beam, and by forming a recording mark having a size corresponding to the formed optical aperture, in the recording layer, and
reproduction is performed by irradiating a light beam of an intensity at a reproduction level thereby to form a smaller optical aperture in the super-resolution film for reproduction than a spot size of the light beam, and by reading out a recording mark formed in the recording layer, through the formed optical aperture.

7. The method according to claim 6, wherein
a red laser beam is used as the light beam for recording and reproducing.

8. The method according to claim 6, wherein
a blue laser beam is used as the light beam for recording and reproducing.

9. The method according to claim 6, wherein the optical disk further comprising a reflective film, and wherein the super-resolution film for reproduction, the recording layer, the super-resolution film for recording and the reflective layer are arranged in this order from the light incident side.

10. An optical disk, comprising:
a recording layer onto which light is irradiated to perform recording/reproducing of information;
a super-resolution film for reproduction provided in a light entering side of the recording layer;
a super-resolution film for recording provided in a side opposite to the light entering side of the recording layer; and
a reflective film provided in a side opposite to the light entering side of the super-resolution film for recording.

11. The optical disk according to claim 10, wherein
the super-resolution film for recording and the super-resolution film for reproduction comprise semiconductor films or semiconductor particle dispersed films which have characteristics that absorbance decreases due to light excitation, and wherein
the semiconductor comprising the super-resolution film for recording has a lower light excitation probability than the semiconductor comprising the super-resolution film for reproduction.

12. The optical disk according to claim 11, wherein the super-resolution film for recording has a structure in which fine particles of semiconductor, selected from the group consisting of CdTe, GaTe, AlSb, GeS, SbS, and CdGeP are dispersed in a transparent dielectric matrix, and
the super-resolution film for reproduction has a structure in which fine particles of semiconductor selected from the group consisting of AgInS, CdSe, CuO, CaSi, GaSe, GeS, AgInSi and AgSbS, are dispersed in a transparent dielectric matrix.

13. The optical disk according to claim 11, wherein
the super-resolution film for recording film has a structure in which fine particles of semiconductor, selected from the group consisting of CdS, ZnSe, SiC, GaS, InO, AlP, PbO, and CuAlS, are dispersed in a transparent dielectric matrix, and
the super-resolution film for reproduction has a structure in which fine particles of semiconductor, selected from the group consisting of ZnSe, GaS, InO and SiC, are dispersed in a transparent dielectric base material.

14. The optical disk according to claim 10, wherein the super-resolution film for reproduction has characteristics that an optical aperture smaller than a spot size of a reproduction beam is formed by irradiating a reproduction beam.

15. The optical disk according to claim 10, wherein the super-resolution film for recording has characteristics that an optical aperture smaller than a spot size of a recording beam is formed by irradiating a recording beam.

* * * * *